United States Patent
Pernechele

(10) Patent No.: US 12,060,975 B2
(45) Date of Patent: Aug. 13, 2024

(54) DUAL TANK PNEUMATIC VALVE

(71) Applicant: AEREA S.p.A., Turate (IT)

(72) Inventor: Luca Andrea Pernechele, Sesto San Giovanni (IT)

(73) Assignee: AEREA S.P.A., Turate (IT)

( * ) Notice: Subject to any disclaimer, the term of this patent is extended or adjusted under 35 U.S.C. 154(b) by 217 days.

(21) Appl. No.: 17/395,603

(22) Filed: Aug. 6, 2021

(65) Prior Publication Data

US 2022/0042620 A1   Feb. 10, 2022

(30) Foreign Application Priority Data

Aug. 7, 2020   (IT) .................. 102020000019693

(51) Int. Cl.
| | |
|---|---|
| *F17C 1/00* | (2006.01) |
| *B60K 15/063* | (2006.01) |
| *F16K 31/42* | (2006.01) |
| *F17C 13/04* | (2006.01) |

(52) U.S. Cl.
CPC ................ *F17C 1/00* (2013.01); *F16K 31/42* (2013.01); *F17C 13/04* (2013.01); *B60K 15/063* (2013.01); *F17C 2205/0323* (2013.01)

(58) Field of Classification Search
CPC .... F17C 13/04; F17C 1/00; F17C 2205/0323; B60K 2015/3032; B60K 15/063; Y10T 137/2788; Y10T 137/86187; Y10T 137/8622; Y10T 137/86228; F16K 31/42
See application file for complete search history.

(56) References Cited

U.S. PATENT DOCUMENTS

| | | | | |
|---|---|---|---|---|
| 2,185,796 | A | | 1/1940 | McInnis et al. |
| 4,104,158 | A | * | 8/1978 | Davis ....................... B01J 49/85 210/139 |
| 5,305,794 | A | * | 4/1994 | George ................... F17C 13/04 251/117 |
| 5,813,429 | A | * | 9/1998 | Ohtaka ..................... F17C 5/06 137/341 |
| 11,643,994 | B2 | * | 5/2023 | Holder ...................... F02K 9/52 60/258 |
| 2002/0134440 | A1 | * | 9/2002 | Mandzuk ............... G05D 23/20 137/590 |
| 2005/0263186 | A1 | * | 12/2005 | Ricco ....................... F17C 9/02 137/392 |

(Continued)

FOREIGN PATENT DOCUMENTS

| | | |
|---|---|---|
| DE | 893015 C | 10/1953 |
| DE | 1032288 B | 6/1958 |

(Continued)

OTHER PUBLICATIONS

Italian Search Report dated Apr. 29, 2021.

*Primary Examiner* — Jessica Cahill
(74) *Attorney, Agent, or Firm* — Heslin Rothenberg Farley & Mesiti P.C.; Victor A. Cardona, Esq.

(57) ABSTRACT

A pneumatic actuator is designed to dispense a predetermined volume of compressed air from a main tank to an outlet of a solenoid valve. The actuator includes a secondary tank designed to contain such predetermined volume of compressed air. The secondary tank is placed in communication with the main tank through a narrow duct having a through-flow section much smaller than that of the outlet of the solenoid valve.

8 Claims, 3 Drawing Sheets

(56) References Cited

U.S. PATENT DOCUMENTS

| | | | |
|---|---|---|---|
| 2009/0212244 A1* | 8/2009 | Pfaff | F16K 31/0648 |
| | | | 251/30.03 |
| 2009/0236551 A1* | 9/2009 | Nomichi | F17C 13/04 |
| | | | 137/79 |
| 2016/0223139 A1 | 8/2016 | Di Crisci | |
| 2017/0254428 A1* | 9/2017 | Barnes | F17C 1/00 |
| 2021/0332908 A1* | 10/2021 | Pernechele | F16K 31/40 |
| 2022/0034454 A1* | 2/2022 | Rau | F17C 13/04 |

FOREIGN PATENT DOCUMENTS

| | | | | |
|---|---|---|---|---|
| DE | 3344331 | A1 | 6/1985 | |
| DE | 102018215384 | A1 * | 3/2020 | F17C 13/04 |
| FR | 1125346 | A | 10/1956 | |

\* cited by examiner

DUAL TANK PNEUMATIC VALVE

CROSS REFERENCE TO RELATED APPLICATIONS

This application claims priority from Italian Patent Application No. 102020000019693 filed on Aug. 7, 2020, the entire disclosure of which is incorporated herein by reference.

FIELD OF THE INVENTION

The present invention relates to a pneumatic actuator designed to dispense a predetermined volume of compressed air from a tank to an outlet of a solenoid valve. Such actuators are for example used to actuate release or ejection devices in the aerospace industry.

STATE OF THE PRIOR ART

The pneumatic actuators currently available on the market are normally equipped with direct or pilot operated solenoid valves.

In direct solenoid valves, the solenoid acts directly on a shutter, preloaded by a spring, which occludes the outlet of the valve. Direct valves can operate at relatively low operating pressures or low air flow rates. As a matter of fact, direct valves remain open over the entire solenoid energising time but they have the defect lying in the fact that, if the force of the preloading spring is not sufficient to oppose the tank pressure to close the opening when the solenoid is de-energised, they do not allow an accurate control of the amount of air dispensed for each actuation of the actuator.

In pilot operated valves, the solenoid instead acts on a small pilot section capable of generating the force required to open the main section. Pilot operated valves are used for high pressures or significant air flow rates. However, pilot operated valves have the defect lying in the fact that, based on a pressure deficiency, they close only when the downstream pressure is significantly lower than the upstream pressure, irrespective of the solenoid energising time. Even in this case, especially if the tank pressure is much higher than the pressure downstream of the valve, it is not possible to obtain an accurate control of the amount of air dispensed for each actuator actuation, given that the solenoid valve is closed only when the pressure downstream of the tank drops far below that of the tank. For example, if the valve pressurises a conduit to pneumatically eject an object, the amount of air that will flow through will depend not on the valve actuation time but on the geometries and the object ejection time. Even in this case, it is therefore not possible to obtain an accurate control of the amount of air dispensed for each actuation of the actuator, especially if the tank pressure is much higher than that downstream of the valve.

There is therefore a need for a pneumatic actuator suitable to operate with high pressures and flow rates of the air contained in a tank, and which is capable of carrying out a given number of pneumatic actuations allowing to accurately control the volume of air ejected each time, irrespective of the pressure downstream of the tank.

SUMMARY OF THE INVENTION

According to the invention, these objects are achieved by means of a pneumatic actuator of the type defined in the preamble of claim 1, whose primary characteristic lies in the fact that it comprises a secondary tank designed to contain a predetermined volume of compressed air and placed in communication with the tank through a narrow duct having a through-flow section considerably smaller than that of the outlet of the compressed air.

Thanks to this solution idea, the actuator according to the invention allows to dispense the predetermined volume of compressed air contained in the secondary tank and to close the outlet of the valve before the airflow, slowed by the narrow duct, can flow from the main tank to the secondary tank. In this manner, for a certain period of time after opening the valve, the pressure in the secondary tank remains considerably lower than that of the main tank, allowing the valve to close easily.

In the subsequent instants, the air flows from the main tank to the secondary tank through the narrow duct, thus acquiring balance. Thus, the system is ready for a subsequent actuation. It is thus possible to provide a plurality of pneumatic actuations in which, at each actuation, the predetermined volume of air is ejected irrespective of the pressure of the main tank or of the pressure conditions downstream of the outlet.

In a preferred embodiment of the invention the solenoid valve is a pilot operated valve including a main valve which controls the outflow of compressed air from the secondary tank, and a pilot solenoid valve suitable to actuate the main valve. In this manner, the actuator according to the invention can also operate at high air pressures in the tank and with significant flow rates.

In an embodiment, the main tank and the secondary tank are integrated in a single body.

According to an advantageous aspect of the invention, the actuator may be operatively associated with an aerospace release or ejection device.

BRIEF DESCRIPTION OF THE DRAWINGS

The invention will now be described in detail with reference to the attached drawings, provided purely by way of non-limiting example, wherein.

DETAILED DESCRIPTION OF THE INVENTION

Figure 1:
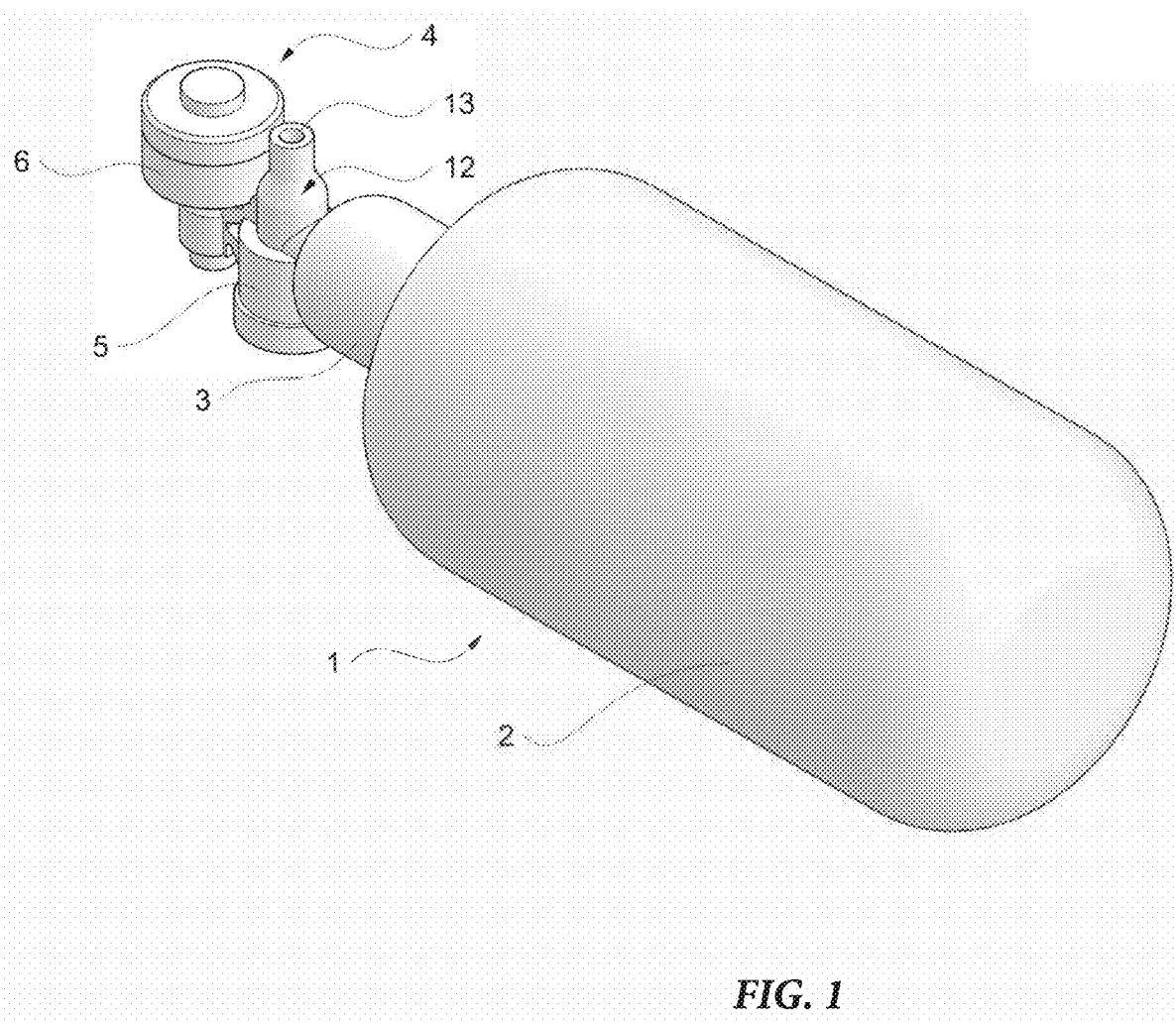
FIG. 1 is a schematic perspective view of an embodiment of the pneumatic actuator according to the invention.

Initially referring to FIG. 1, a pneumatic actuator according to the invention comprising a generally cylindrical main tank 2, arranged beside which is a secondary tank 3, positioned on which is a pilot operated valve generally indicated with 4, is illustrated with 1.

The main tank 2 and the secondary tank 3 may be conveniently integrated in a single body.

Figure 2:
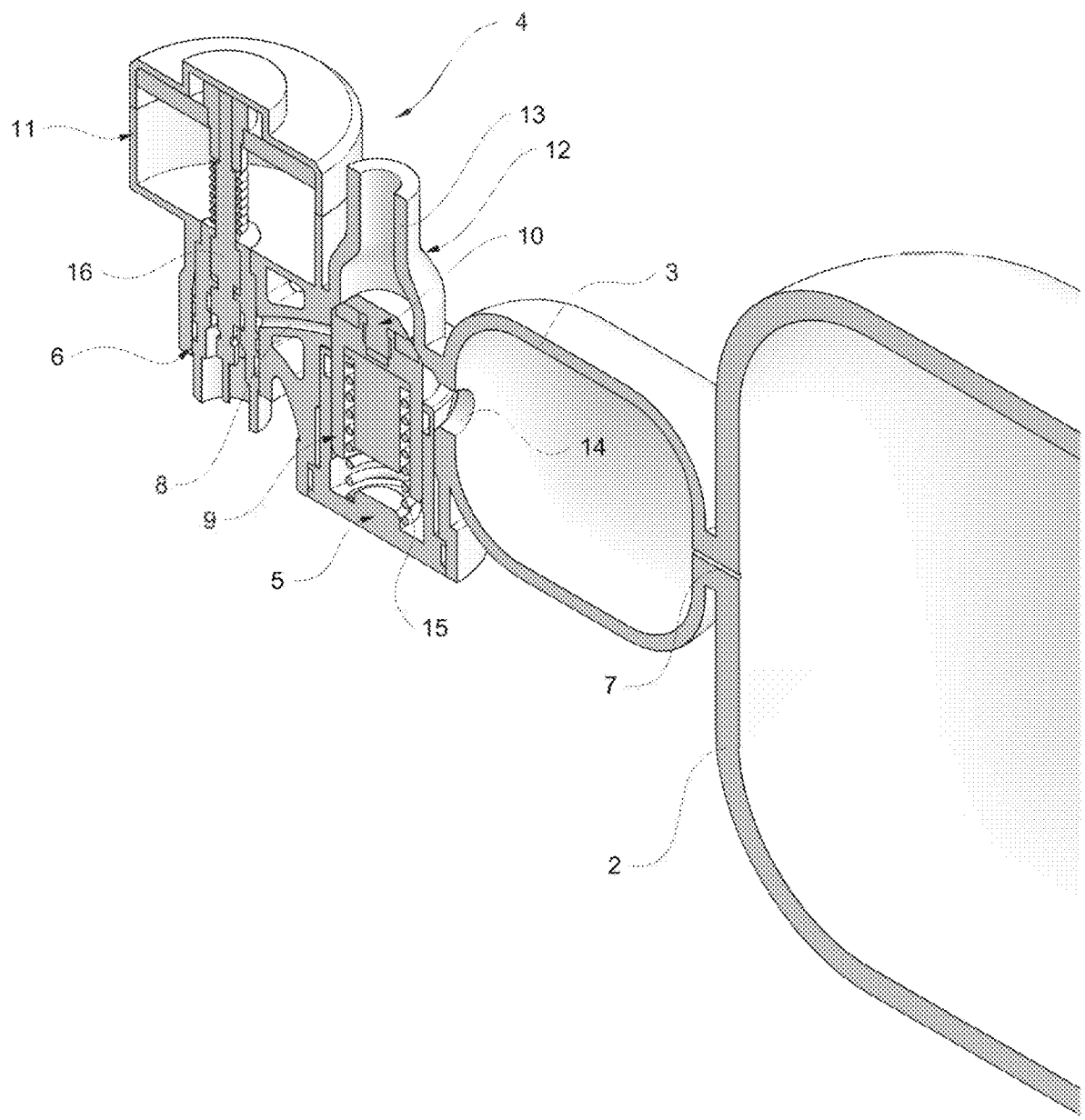
FIG. 2 is a perspective view in longitudinal section and in enlarged scale of a part of FIG. 1.
Figure 3:
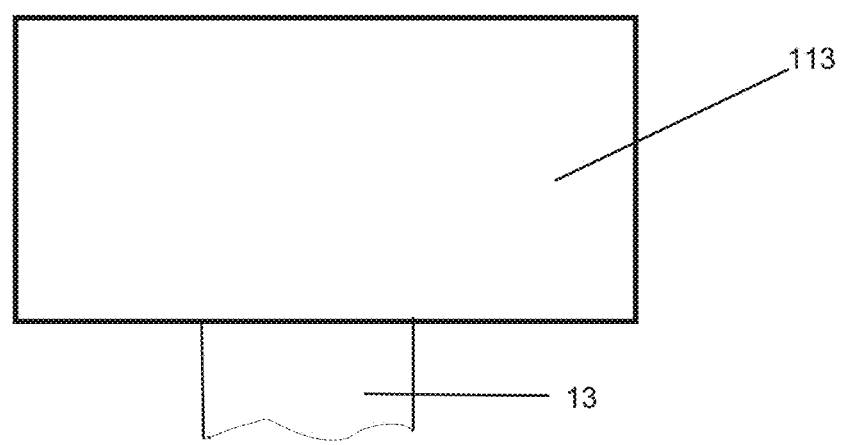
FIG. 3 is a block diagram view of the outlet of FIG. 1 connected to an aerospace release or ejection device.

As better observable in FIG. 2, the valve 4 comprises a main pneumatic valve 5 connected to the secondary tank 3, and a pilot solenoid valve 6 connected to the main valve 5 by means of a duct 8. The main valve 5 is designed to place an outlet 14 of the secondary tank 3 in communication with an outlet 13 of the valve.

In a generally conventional manner, the pilot solenoid valve 6 comprises a solenoid actuator 11 which actuates a shutter 16 which controls the opening of the main valve 5.

The main valve 5 comprises an air outflow section 12 including the outlet 13, and a valve section 10 with a shutter 9 normally kept closed by the action of a spring 15 and which is opened by the pilot operated valve 6 to control the outflow of the compressed air coming from the secondary tank 3, through the outlet 13.

According to the invention, the main tank 2 is placed in communication with the secondary tank 3 through a narrow duct 7 so that the pressurised air contained in the main tank 2 can flow into the secondary tank 3 as explained hereinafter.

The through-flow section of the duct 7 is considerably smaller than that of the outlet 13: in the embodiment of the invention shown in the figures, such narrow duct 7 has a section that is about 1/7 with respect to that of the air outlet 13, but narrow ducts with smaller or larger narrow sections, depending on the pressures and the compressed air flow rates used by the actuator 1, may be used.

The actuator 1 according to the invention operates as follows.

In the de-energised condition of the solenoid 11, the shutter 9 of the main valve 5 is kept closed by the spring 15 and by the pressure contained in the tank, blocking the outflow of air from the tank 3.

When the solenoid 11 is energised, the pilot operated valve 6 opens the shutter 10 by means of a pneumatic pulse in the duct 8, placing the secondary tank 3 in communication with the outlet 13. In this manner, the predetermined volume of compressed air contained in the secondary tank 3 flows from the outlet 13, actuating, for example, a secondary actuator not shown because it is within the reach of a person skilled in the art. This actuator may consist, for example, of a release or ejection device 113 in the aerospace industry.

After the predetermined volume of compressed air contained in the secondary tank 3 has been ejected, the pilot operated valve 6 is de-energised and the shutter 9 immediately returns to the closed position thanks to the action of a spring 15, and only subsequently does the air contained in the main tank 2 fill the secondary tank 3 again, restoring balance in the pressures between the tanks 2, 3.

It is therefore clear that, if the through-flow section of the narrow duct 7 is sufficiently smaller than that of the outflow of compressed air 13, the air does not have time to flow from the main tank 2 to the secondary tank 3 before the valve 5 closes. In the instants subsequent to the closing of the valve 5, the air flows from the main tank 2 to the secondary tank 3 and the actuator 1 is ready for the subsequent actuation.

Obviously, the construction details and the embodiments may widely vary with respect to what has been described and illustrated, without departing from the scope of protection of the present invention as defined in the claims that follow. Thus, for example, the general conformation of tanks 2, 3 could be different from the one represented in the drawings.

The invention claimed is:

1. A pneumatic actuator comprising:
    a compressed air tank designed to contain a first predetermined volume of compressed air;
    a pilot operated valve comprising an inlet connected to a compressed air secondary tank, an outlet for compressed air, and a shutter between said inlet and said outlet;
    said compressed air secondary tank designed to contain a second predetermined volume of compressed air which has a lower volume than said first predetermined volume of compressed air and placed in communication with said compressed air tank through a narrow duct having a through-flow section smaller than said inlet;
    said pilot operated valve configured to dispense second predetermined volume of compressed air from said compressed air secondary tank to said outlet when said pilot operated valve is energized;
    said pilot operated valve configured to open said shutter when said pilot operated valve is energized and eject said second predetermined volume of compressed air contained in said compressed air secondary tank through said outlet; and
    said pilot operated valve configured to immediately close said shutter before compressed air flow can flow from said compressed air tank to said compressed air secondary tank when said pilot operated valve is de-energised.

2. The pneumatic actuator according to claim 1, wherein said pilot operated valve comprises a main valve which controls the outflow of the compressed air from the compressed air secondary tank, and a pilot solenoid valve for actuating the main valve.

3. The pneumatic actuator according to claim 1, wherein said compressed air tank and said compressed air secondary tank are integrated in a single body.

4. The pneumatic actuator according to claim 1, wherein said outlet is connected to an aerospace release or ejection device.

5. The pneumatic actuator according to claim 4, wherein said through-flow section of said narrow duct has a cross-sectional area about 1/7 of the cross-sectional area of said inlet of said pilot operated valve.

6. The pneumatic actuator according to claim 1, wherein a through-flow section of said narrow duct has a cross-sectional area 1/7 or less than the cross-sectional area of said inlet of said pilot operated valve.

7. The pneumatic actuator according to claim 1, further comprising a spring attached to said shutter, wherein said spring is configured to keep said shutter closed to block an outflow of compressed air from said compressed air secondary tank to said pilot operated valve.

8. The pneumatic actuator according to claim 1, further comprising a spring attached to said shutter, wherein said spring is configured to immediately close said shutter when said pilot operated valve is de-energised.

* * * * *